(12) United States Patent
Schwary

(10) Patent No.: US 9,573,643 B1
(45) Date of Patent: Feb. 21, 2017

(54) BICYCLE SEAT ASSEMBLY

(71) Applicant: S R Schwary, Camas, WA (US)

(72) Inventor: S R Schwary, Camas, WA (US)

(*) Notice: Subject to any disclaimer, the term of this patent is extended or adjusted under 35 U.S.C. 154(b) by 0 days.

(21) Appl. No.: 14/839,436

(22) Filed: Aug. 28, 2015

(51) Int. Cl.
*B62J 1/00* (2006.01)
*B62J 1/10* (2006.01)
*B62J 1/18* (2006.01)

(52) U.S. Cl.
CPC .... *B62J 1/10* (2013.01); *B62J 1/18* (2013.01)

(58) Field of Classification Search
CPC ........................................ B62J 1/10; B62J 1/18
USPC .................................... 297/201, 202, 215.15
See application file for complete search history.

(56) References Cited

U.S. PATENT DOCUMENTS

| 560,698 | A | * | 5/1896 | Dyer | B62J 1/005 297/201 |
| 604,347 | A | * | 5/1898 | Bray | B62J 1/005 297/201 |
| 635,598 | A | * | 10/1899 | Rowe | B62J 1/005 297/201 |
| 642,191 | A | * | 1/1900 | Wright | B62J 1/005 297/201 |
| 4,773,705 | A | | 9/1988 | Terranova | |
| 4,877,286 | A | * | 10/1989 | Hobson | B62J 1/002 297/201 |
| 5,295,727 | A | | 3/1994 | Kao | |
| D370,132 | S | | 5/1996 | Urias | |
| 5,911,474 | A | * | 6/1999 | Lee | B62J 1/005 297/201 |
| 6,074,002 | A | | 6/2000 | Hansen | |
| 6,131,994 | A | | 10/2000 | Yates | |
| 6,209,954 | B1 | * | 4/2001 | Bombardier | B62J 1/005 297/201 |
| 6,254,180 | B1 | * | 7/2001 | Nelson | B62J 1/002 297/201 |
| 6,290,291 | B1 | * | 9/2001 | Kojima | B62J 1/10 297/201 |
| 6,371,554 | B1 | * | 4/2002 | Ko | B62J 1/005 297/201 X |
| 6,402,236 | B1 | * | 6/2002 | Yates | B62J 1/10 297/201 |
| 6,652,025 | B2 | | 11/2003 | Sylvester | |
| 7,059,674 | B2 | * | 6/2006 | Garland | B62J 1/00 297/202 X |
| 7,104,600 | B2 | * | 9/2006 | Scholz | B62J 1/005 297/201 |
| 7,121,622 | B1 | * | 10/2006 | Mendez | B62J 1/00 297/201 |
| 7,581,787 | B2 | * | 9/2009 | Livne | B62H 5/00 297/201 |
| D609,480 | S | | 2/2010 | Ascher | |
| 7,699,391 | B2 | * | 4/2010 | Riondato | B62J 1/007 297/202 |
| 8,668,259 | B2 | | 3/2014 | Ulrich | |

(Continued)

FOREIGN PATENT DOCUMENTS

WO WO2012050288 4/2012

*Primary Examiner* — Rodney B White

(57) ABSTRACT

A bicycle seat assembly for providing enhanced comfort while riding a bicycle includes a mount that may be coupled to a seat post of a bicycle. A seat is rotatably coupled to the mount such that the seat may be positionable at a selected angle with respect to the seat post. The seat is structured to be substantially chevron shaped thereby enhancing a comfort of the seat.

12 Claims, 5 Drawing Sheets

(56) References Cited

U.S. PATENT DOCUMENTS

| | | | |
|---|---|---|---|
| 8,944,501 B2* | 2/2015 | Tseng | B62J 1/002 |
| | | | 297/201 |
| 2003/0067195 A1* | 4/2003 | Sylvester | B62J 1/005 |
| | | | 297/201 |
| 2005/0173951 A1* | 8/2005 | Jalkanen | A47C 7/022 |
| | | | 297/201 |
| 2007/0262623 A1 | 11/2007 | Fortt | |
| 2008/0265635 A1* | 10/2008 | Scheffer | B62J 1/007 |
| | | | 297/201 |
| 2009/0079237 A1* | 3/2009 | Riondato | B62J 1/007 |
| | | | 297/201 |
| 2010/0123339 A1* | 5/2010 | Wen | B62J 1/005 |
| | | | 297/201 |
| 2011/0260510 A1* | 10/2011 | Hsu | B62J 1/08 |
| | | | 297/201 |
| 2012/0286548 A1* | 11/2012 | Bailie | B62J 1/10 |
| | | | 297/201 |
| 2015/0251717 A1* | 9/2015 | Portz | B62J 1/005 |
| | | | 297/201 |
| 2016/0068212 A1* | 3/2016 | Hamel | B62J 1/005 |
| | | | 297/201 |

\* cited by examiner

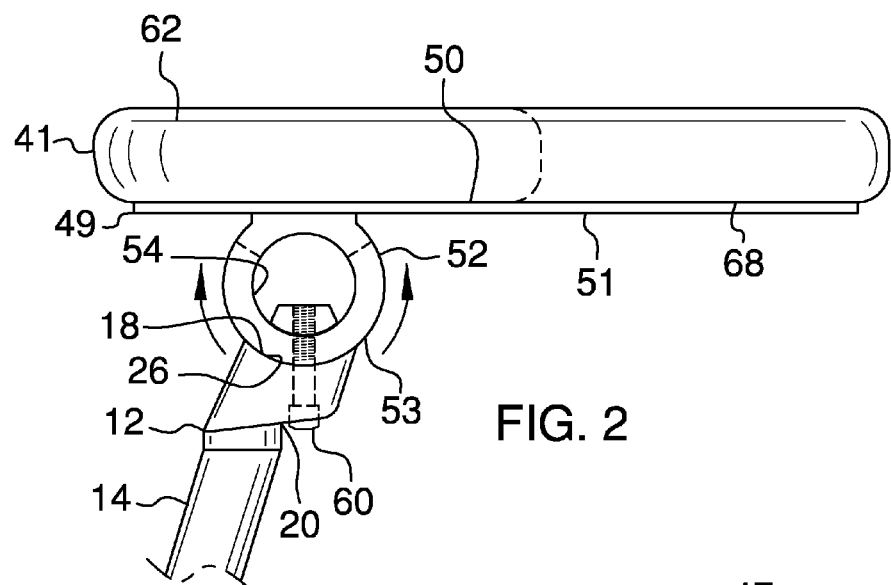
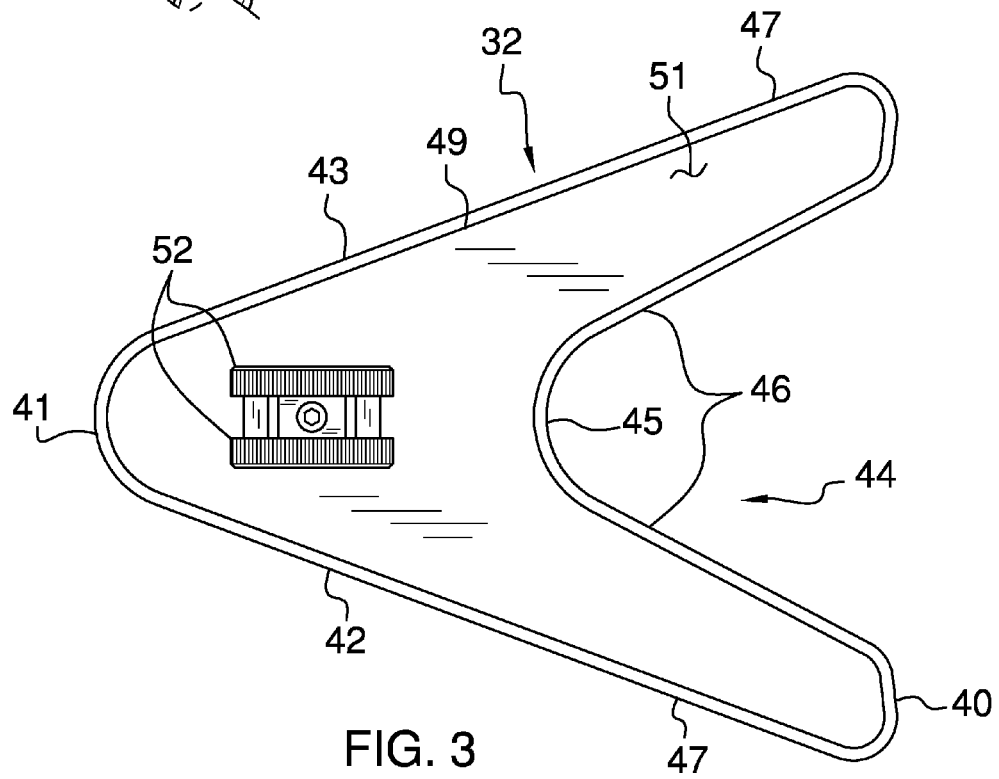

BICYCLE SEAT ASSEMBLY

BACKGROUND OF THE DISCLOSURE

Field of the Disclosure

The disclosure relates to seat devices and more particularly pertains to a new seat device for providing enhanced comfort while riding a bicycle.

SUMMARY OF THE DISCLOSURE

An embodiment of the disclosure meets the needs presented above by generally comprising a mount that may be coupled to a seat post of a bicycle. A seat is rotatably coupled to the mount such that the seat may be positionable at a selected angle with respect to the seat post. The seat is structured to be substantially chevron shaped thereby enhancing a comfort of the seat.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 2 is a left side view of an embodiment of the disclosure.

FIG. 3 is a bottom view of an embodiment of the disclosure.

DESCRIPTION OF THE PREFERRED EMBODIMENT

Figure 1:
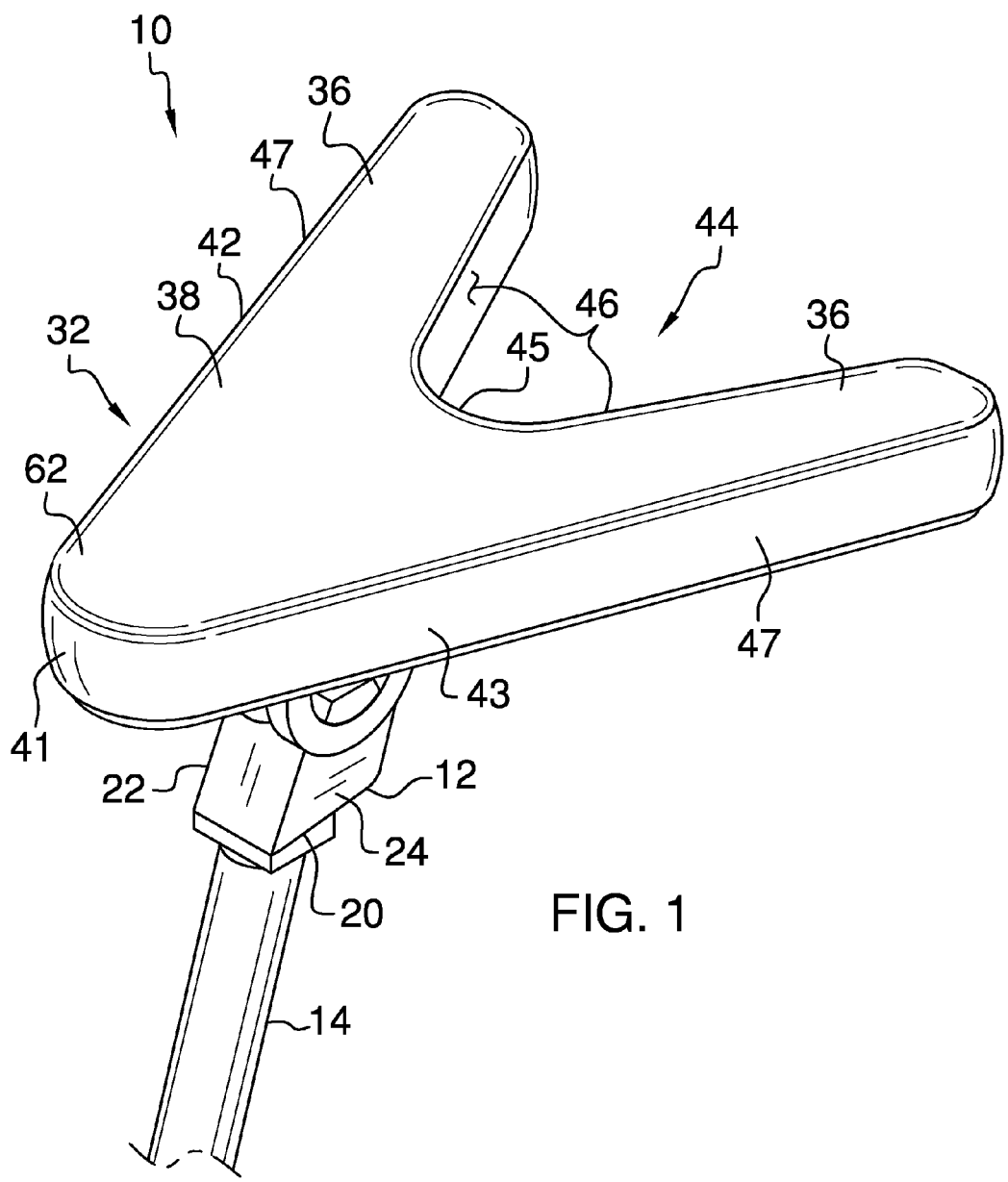
FIG. 1 is a perspective view of a bicycle seat assembly according to an embodiment of the disclosure.
Figure 4:
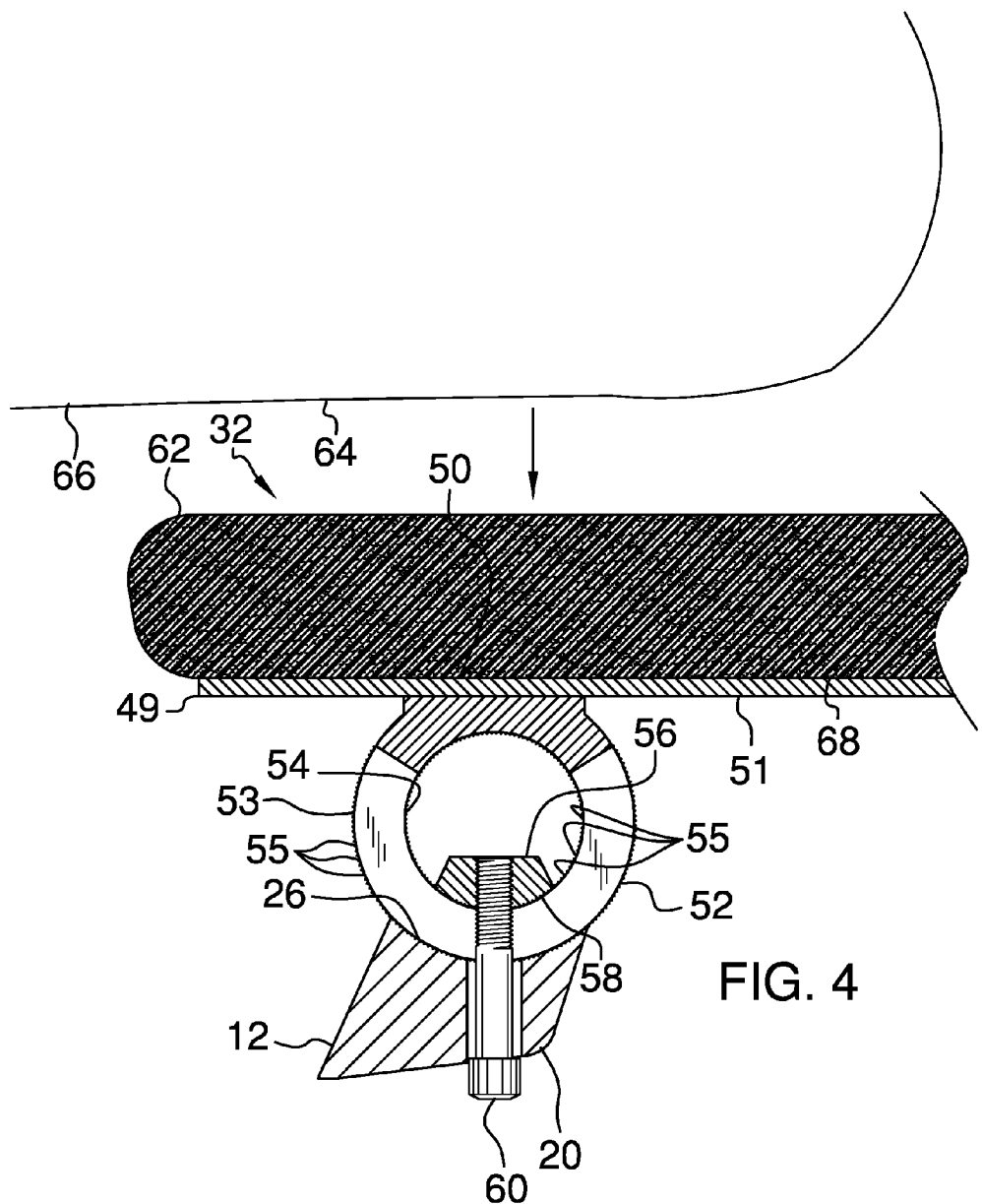
FIG. 4 is a left side cut-away view of an embodiment of the disclosure.

With reference now to the drawings, and in particular to FIGS. 1 through 6 thereof, a new seat device embodying the principles and concepts of an embodiment of the disclosure and generally designated by the reference numeral 10 will be described.

As best illustrated in FIGS. 1 through 6, the bicycle seat assembly 10 generally comprises a mount 12 that may be coupled to a seat post 14 of a bicycle 16. The mount 12 has a top end 18, a bottom end 20, a first lateral side 22 and a second lateral side 24. The top end 18 has a mating surface 26 and the bottom end 20 may be coupled to the seat post 14. A seat 32 is rotatably coupled to the mount 12 such that the seat 32 may be positionable at a selected angle with respect to the seat post 14. The seat 32 is structured to be substantially chevron shaped thereby enhancing a comfort of the seat 32.

The seat 32 has a pair of wings 36 and a body 38. Each of the wings 36 extends away from the body 38 and each of the wings 36 has a distal end 40 with respect to the body 38. The body has a nose 41 with respect to the wings 36, a first lateral edge 42 and a second lateral edge 43. The wings 36 angle away from each other such that the distal ends 40 are spaced apart from each other to define a notch 44 between the wings 36.

Figure 5:
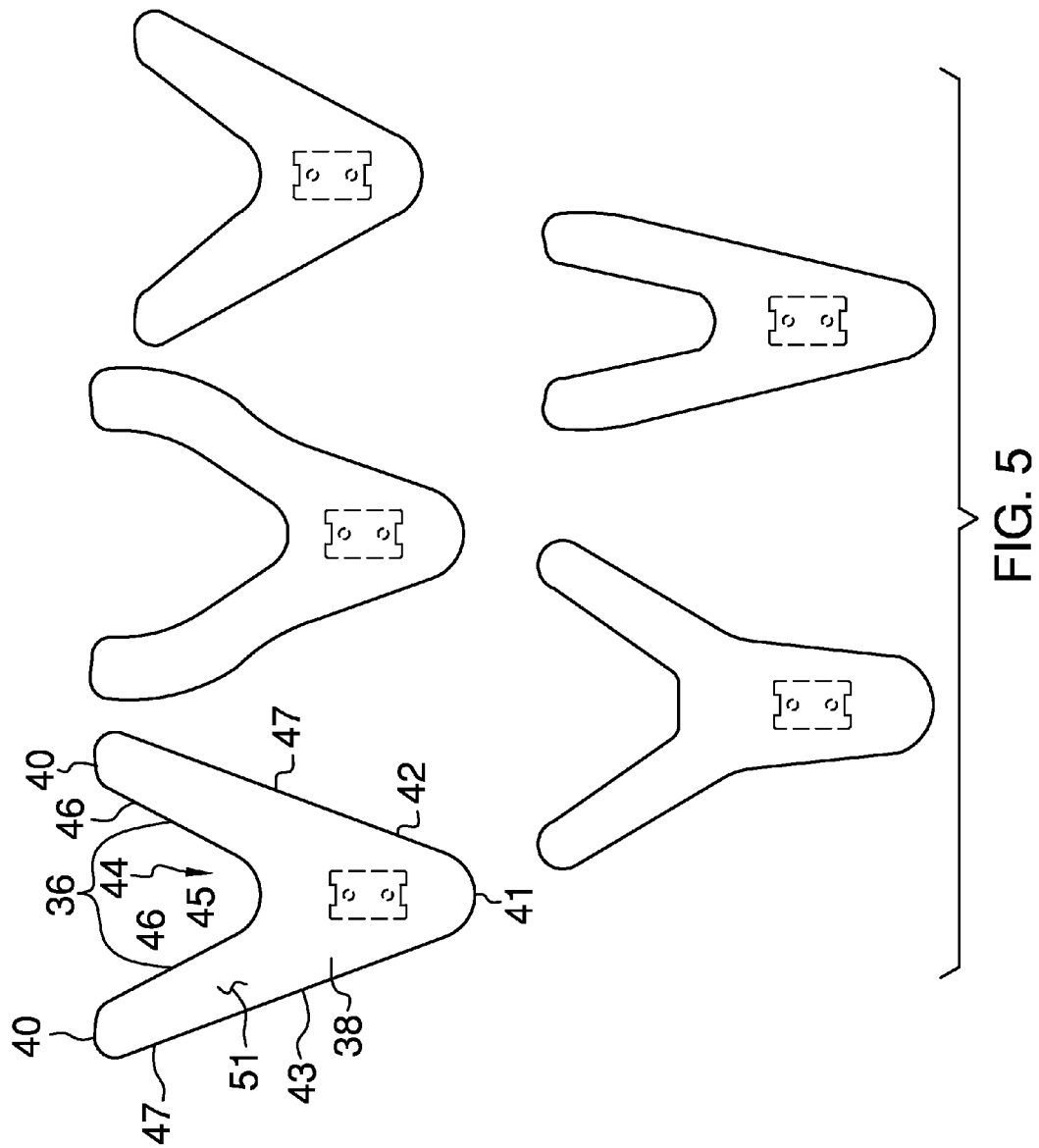
FIG. 5 is a bottom perspective view of an embodiment of the disclosure.
Figure 6:
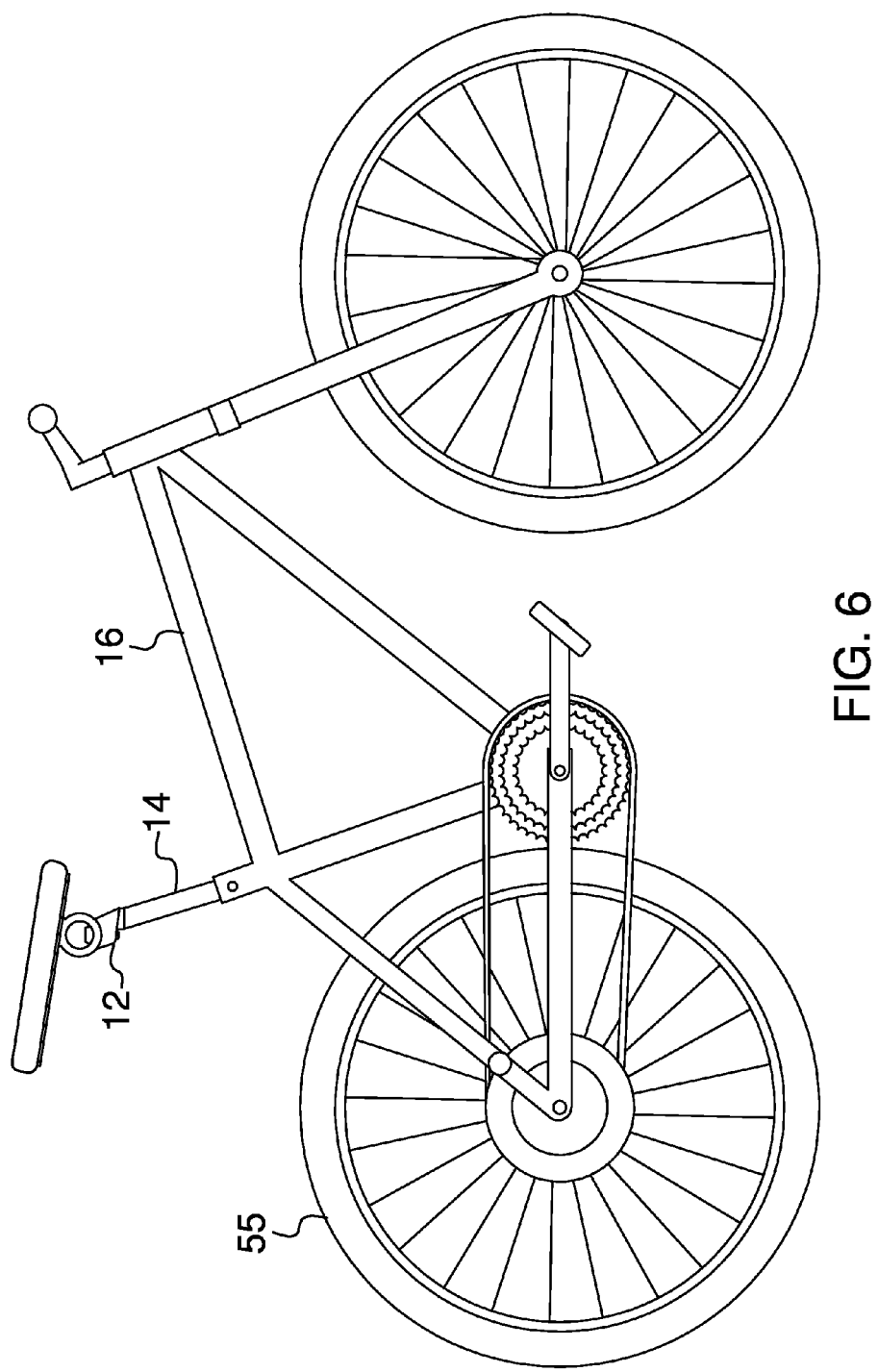
FIG. 6 is a perspective in-use view of an embodiment of the disclosure.

The notch 44 has a terminal surface 45 and a pair of lateral bounding surfaces 46. The terminal surface 45 is spaced from the nose 41 and the terminal surface 45 is aligned with the nose 41. Each of the wings 36 has an outwardly facing edge 47. The seat includes a plate 49 that has a top surface 50 and a bottom surface 51. As shown in FIG. 5, the wings 36 may be oriented at a variety of angles with respect to each other and the wings 36 may be curved between the body 38 and the distal ends 40.

A distance between the nose 41 and the terminal surface 45 ranges between seven cm and sixteen cm. A distance between the first lateral edge 42 and the second lateral edge 43 of the body 38 ranges between five cm and thirteen cm. A distance between the terminal surface 45 and a midpoint 48 of each of the wings 36 ranges between two cm and twelve cm. A distance between the midpoint 48 and the distal end 40 of each of the wings 36 ranges between five cm and thirteen cm. A distance between the pair of lateral bounding surfaces 46 ranges between five cm and fifteen cm.

A pair of rings 52 are each coupled to the bottom surface 51 of the plate 49 and each of the rings 52 are continuous such that the ring 46 forms closed loop. The rings 52 are spaced apart from each other. Each of the rings 52 has an outer surface 53 and an inner surface 54. Each of the outer surface 53 and the inner surface 54 comprises a plurality of teeth 55 that are distributed around each of the rings 52.

The outer surface 53 engages the mating surface 26 of the mount 12. Each of the rings 52 is rotatable about an axis extending through the first lateral side 22 and the second lateral side 24 of the mount 12. Thus, the seat 32 may be positioned at a selected angle with respect to the seat post 14. The seat 32 is oriented such that each of the wings 36 is directed toward a rear tire 55 of the bicycle 16.

A block 56 is provided that has a mating surface 58 and the block 56 is positioned such that the mating surface 58 of the block 56 abuts the inner surface 54 of each of the rings 52. A screw 60 extends through the mount 12, between the rings 52 and the through the block 56. The screw 60 threadably engages the block 56 such that the screw 60 selectively compresses each of the rings 52 between the mating surface 58 of the block 56 and the mating surface 26 of the mount 12 when the screw 60 is tightened. The teeth 55 on the outer surface 53 engage the mating surface 26 of the mount 12 and the teeth 55 on the inner surface 54 engage the mating surface 58 of the block 56 such that the plate 49 is retained at the selected angle.

A pad 62 is provided that has a lower surface 68. The lower surface 68 is coupled to the top surface 50 of the plate 49 having the pad 62 being coextensive with the plate 49. Thus, the pad 62 and the plate 49 have a similar V-shape. The V-shape of the seat 32 enhances comfort of the seat 32 by reducing pressure against a bottom 64 of a user's thighs 66 when the user 66 sits on the seat 32. The pad 62 is comprised of a resiliently compressible material such as body-gel or foam rubber. The pad 62 may have a thickness ranging between one cm and three cm.

In use, the screw 60 is loosened and the ring 46 is rotated between the block 56 and the mount 12 until the plate 49 and the pad 62 are oriented at the selected angle. The screw 60 is tightened to retain the plate 49 and the pad 62 at the selected angle. The pad 62 is sat upon while the bicycle 16 is ridden.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A bicycle seat assembly configured to be positioned at a selected angle with respect to a bicycle, said assembly comprising:
   a mount being configured to be coupled to a seat post of a bicycle; and
   a seat being rotatably coupled to said mount such that said seat is configured to be positionable at a selected angle with respect to the seat post, said seat being structured to be substantially chevron shaped thereby enhancing comfort of said seat, wherein said seat comprises
   a plate having a top surface and a bottom surface, and
   a pair of rings, said rings being spaced apart from each other, each of said rings being coupled to said bottom surface, each of said rings being continuous such that each of said rings forms a closed loop, each of said tings having an outer surface and an inner surface, each of said outer surface and said inner surface comprising a plurality of teeth being distributed around each of said rings.

2. The assembly according to claim 1, wherein said mount has a top end, a bottom end, a first lateral side and a second lateral side, said top end having a mating surface, said bottom end being configured to be coupled to the seat post.

3. The assembly according to claim 1, wherein said seat has a pair of wings and a body, each of said wings extending away from said body, said body having a nose with respect to said wings, a first lateral edge and a second lateral edge, each of said wings having a distal end with respect to said body, said wings angling away from each other having said distal ends being spaced apart from each other to define a notch between said wings.

4. The assembly according to claim 3, wherein said notch has a terminal surface and a pair of lateral bounding surfaces, said terminal surface being spaced from said nose, said terminal surface being aligned with said nose, each of said wings having an outwardly facing edge.

5. The assembly according to claim 4, wherein:
   a distance between said nose and said terminal surface ranges between seven cm and sixteen cm; and
   a distance between said first lateral edge and said second lateral edge of said body ranges between five cm and thirteen cm.

6. The assembly according to claim 4, wherein:
   a distance between said terminal surface and a midpoint of each of said wings ranges between two cm and twelve cm; and
   a distance between said midpoint and said distal end ranges between five cm and thirteen cm.

7. The assembly according to claim 4, wherein a distance between said pair of lateral bounding surfaces ranges between five cm and fifteen cm.

8. The assembly according to claim 1, wherein said seat further comprises a block having a mating surface, said block being positioned such that said mating surface abuts said inner surface of said ring.

9. The assembly according to claim 8, wherein said outer surface engages said mating surface such that each of said rings is rotatable about an axis extending through a first lateral side and a second lateral side of said mount wherein said plate is configured to be positioned at a selected angle with respect to the seat post said plate being oriented such that each of a pair of wings of said seat is directed toward a rear tire of the bicycle.

10. A bicycle seat assembly configured to be positioned at a selected angle with respect to a bicycle, said assembly comprising:
    a mount being configured to be coupled to a seat post of a bicycle;
    a seat being rotatably coupled to said mount such that said seat is configured to be positionable at a selected angle with respect to the seat post, said seat being structured to be substantially chevron shaped thereby enhancing comfort of said seat:
    a mount having a mating surface;
    a pair of rings, each of said rings having an inner surface and an outer surface, each of said inner surface and said outer surface comprising a plurality of teeth;
    a block having a mating surface;
    a plate being coupled to each of said rings; and
    a screw extending through said mount, between said rings and said block, said screw threadably engaging said block such that said screw compresses each of said rings between said mating surface of said block and said mating surface of said mount, said teeth on said outer surface engaging said mating surface of said mount, said teeth on said inner surface engaging said mating surface of said block such that said plate is retained at the selected angle.

11. The assembly according to claim 1, further comprising:
    a plate having a top surface; and
    a pad having a lower surface and an upper surface, said lower surface being coupled to said top surface of said plate having said pad being coextensive with said plate.

12. A bicycle seat assembly configured to be positioned at a selected angle with respect to a bicycle, said assembly comprising:
    a mount being configured to be coupled to a seat post of a bicycle, said mount having a top end, a bottom end, a first lateral side and a second lateral side, said top end having a mating surface, said bottom end being configured to be coupled to the seat post;

a seat being rotatably coupled to said mount such that said seat is configured to be positionable at a selected angle with respect to the seat post, said seat being structured to be substantially chevron shaped thereby enhancing comfort of said seat, said seat having a pair of wings and a body, each of said wings extending away from said body, said body having a nose with respect to said wings, a first lateral edge and a second lateral edge, each of said wings having a distal end with respect to said body, said wings angling away from each other having said distal ends being spaced apart from each other to define a notch between said wings, said notch having a terminal surface and a pair of lateral bounding surfaces, said terminal surface being spaced from said nose, said terminal surface being aligned with said nose, each of said wings having an outwardly facing edge, a distance between said nose and said terminal surface ranging between seven cm and sixteen cm, a distance between said first lateral edge and said second lateral edge of said body ranging between five cm and thirteen cm, a distance between said terminal surface and a midpoint of each of said wings ranging between two cm and twelve cm, a distance between said midpoint and said distal end ranging between five cm and thirteen cm, a distance between said pair of lateral bounding surfaces ranging between five cm and fifteen cm, said seat comprising: a plate having a top surface and a bottom surface, a pair of rings, said rings being spaced apart from each other, each of said rings being coupled to said bottom surface, each of said rings being continuous such that each of said rings forms a closed loop, each of said rings having an outer surface and an inner surface, each of said outer surface and said inner surface comprising a plurality of teeth being distributed around said each of said rings, said outer surface engaging said mating surface such that each of said rings is rotatable about an axis extending through said first lateral side and said second lateral side of said mount wherein said plate is configured to be positioned at a selected angle with respect to the seat post, said plate being oriented such that each of said wings is directed toward a rear tire of the bicycle, a block having a mating surface, said block being positioned such that said mating surface abuts said inner surface of said ring, a screw extending through said mount, between said rings and said block, said screw threadably engaging said block such that said screw compresses each of said rings between said mating surface of said block and said mating surface of said mount, said teeth on said outer surface engaging said mating surface of said mount, said teeth on said inner surface engaging said mating surface of said block such that said plate is retained at the selected angle, and a pad having a lower surface and an upper surface, said lower surface being coupled to said top surface of said plate having said pad being coextensive with said plate.

* * * * *